(12) United States Patent
Inoue et al.

(10) Patent No.: US 12,187,180 B2
(45) Date of Patent: Jan. 7, 2025

(54) VEHICLE

(71) Applicant: YAMAHA HATSUDOKI KABUSHIKI KAISHA, Iwata (JP)

(72) Inventors: Takehiro Inoue, Shizuoka (JP); Atsushi Kamo, Shizuoka (JP); Hiroaki Kurita, Shizuoka (JP); Yoko Takagi, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/338,138

(22) Filed: Jun. 20, 2023

(65) Prior Publication Data

US 2023/0331140 A1 Oct. 19, 2023

Related U.S. Application Data

(63) Continuation-in-part of application No. PCT/JP2021/047476, filed on Dec. 22, 2021.

(30) Foreign Application Priority Data

Dec. 22, 2020 (JP) .................................. 2020-212434

(51) Int. Cl.
*B60Q 1/00* (2006.01)
*B62J 1/18* (2006.01)
(Continued)

(52) U.S. Cl.
CPC .......... *B60Q 1/0011* (2013.01); *B60Q 1/0088* (2013.01); *B62J 1/18* (2013.01);
(Continued)

(58) Field of Classification Search
CPC ...... B60Q 1/0011; B60Q 1/0088; B62J 6/015; B62J 43/30; B62J 1/18; G02B 6/0006
See application file for complete search history.

(56) References Cited

U.S. PATENT DOCUMENTS

| 2011/0013414 A1* | 1/2011 | Smithson ............. G02B 6/0006 |
| | | 362/311.06 |
| 2012/0025962 A1 | 2/2012 | Toll |
| 2018/0252380 A1* | 9/2018 | Kitayama ............ B60Q 1/0035 |

FOREIGN PATENT DOCUMENTS

| JP | 2017-061198 A | 3/2017 |
| JP | 2018-144798 A | 9/2018 |

(Continued)

*Primary Examiner* — Evan P Dzierzynski
*Assistant Examiner* — Jessica M Apenteng
(74) *Attorney, Agent, or Firm* — Rabin & Berdo, P.C.

(57) ABSTRACT

A leaning vehicle or a straddled vehicle, including a vehicle body, a light source unit, a light using device, an optical fiber cable, an electrical power supply unit, a plurality of electrical units, and an electrical cable. The vehicle body includes a seat and a body cover. The optical fiber cable has a supported portion disposed along, and supported by, a trunk portion of the electrical cable, and an upstream portion connecting the light source unit and the supported portion without being supported by the trunk portion. The supported portion and the upstream portion are partially disposed within an in-body covered region, which is at least one of a region closer to a vehicle center than an outermost surface of the body cover is, or a region positioned further in a downward direction than an uppermost portion of the seat is, both being invisible from an outside of the vehicle.

12 Claims, 3 Drawing Sheets

(51) Int. Cl.
  *B62J 6/015*  (2020.01)
  *B62J 43/30*  (2020.01)
  *F21V 8/00*  (2006.01)
(52) U.S. Cl.
  CPC ............... *B62J 6/015* (2020.02); *B62J 43/30* (2020.02); *G02B 6/0006* (2013.01)

(56) References Cited

FOREIGN PATENT DOCUMENTS

| | | | |
|---|---|---|---|
| JP | 2018-144799 | A | 9/2018 |
| JP | 2018144709 | A | 9/2018 |

\* cited by examiner

VEHICLE

CROSS-REFERENCE TO RELATED APPLICATIONS

This is a continuation-in-part application of International Application PCT/JP2021/047476, filed on Dec. 22, 2021, which claims priority from Japanese Patent Application No. 2020-212434, filed on Dec. 22, 2020. The contents of the applications are incorporated herein by reference.

TECHNICAL FIELD

The present teaching relates to a vehicle that is a leaning vehicle or a straddled vehicle.

BACKGROUND ART

A vehicle with a lighting equipment system that uses a laser beam is, for example, shown in Patent Literature 1 (PTL 1). The vehicle according to PTL 1 is a straddled vehicle. The straddled vehicle of PTL 1 can lean left and right.

CITATION LIST

Patent Literature

PTL 1: Japanese Patent Application Laid-Open No. 2018-144798

SUMMARY OF INVENTION

Technical Problem

The present teaching aims to adopt lighting or communication using a laser beam, while obtaining both protection of an optical fiber cable and suppression of a size increase of a vehicle that is a leaning vehicle or a straddled vehicle.

Solution to the Problem

To attain the foregoing aim, the inventors of the present teaching conducted studies as follows.

When a rider operates a leaning vehicle to make a turn for example, the rider needs to shift their weight. A straddled vehicle travels with a rider straddling a seat. Thus, a vehicle that is the leaning vehicle or the straddled vehicle is configured to have a smaller vehicle width than that of a typical four-wheeled vehicle that has a cabin. In general, maneuverability, agility, and simplicity are required of a vehicle that is a leaning vehicle or a straddled vehicle. Thus, a desire for downsizing and weight reducing of a vehicle that is a leaning vehicle or a straddled vehicle is very high. Components of a vehicle body are arranged densely. For example, in a region covered by components such as a fuel tank, a dummy tank with a shape resembling the shape of the fuel tank, a foot board, a seat, or a body cover, components are arranged densely, and spaces between the components are small.

In some case, a vehicle that is a leaning vehicle or a straddled vehicle takes advantage of its small vehicle width, to travel a narrow passage such as a woodland path. In such a narrow passage, the vehicle body may be touched by an obstacle as exemplified by a tree branch.

A leaning vehicle or a straddled vehicle is generally a vehicle that, when not traveling, falls down instead of standing by itself, without a self-supporting mechanism or a support from the rider. If such leaning vehicle or straddled vehicle falls down, the vehicle body touches the ground or the like.

PTL 1 discloses an optical fiber cable being capable of bending freely in accordance with the shape of a routing position in a vehicle body. In general, an optical fiber cable is thinner than a metal core wire of an electrical cable, and the optical fiber cable has a bending stiffness weaker than the stiffness of the electrical cable. Like this, the optical fiber cable is configured to be relatively soft, and easily deformable, and thus can be arranged in a narrow space between components.

To avoid an optical fiber cable from being in contact with an obstacle when the vehicle that is the leaning vehicle or the straddled vehicle travels in a narrow passage, or to avoid an optical fiber cable from being in contact with the ground or the like when the vehicle falls down, it is conceivable that an optical fiber cable be arranged inside a vehicle body.

The optical fiber cable is easily curved upon application of an external force for example, but it is difficult to keep a curved shape after application of the external force is stopped. In addition, the vehicle body of the vehicle suffers vibration while traveling for example. If, therefore, the optical fiber cable is disposed so as to extend in a narrow space between components, the optical fiber cable may be in contact with components due to vibration of the vehicle body. In the vehicle body, a movable part or a component with a relatively high temperature is present. Thus, the contact with the movable part may damage the optical fiber cable, or may deteriorate transmission efficiency. This is why prevention or suppression of contact between the optical fiber cable and other components is important. For example, prevention or suppression of contact is enabled by, for example, providing a wide space between components or additionally providing parts for protecting the optical fiber cable. This, however, leads to a size increase, which is not preferable in the vehicle that is the leaning vehicle or the straddled vehicle. It is not easy to obtain both protection of the optical fiber cable and suppression of the size increase of the vehicle that is the leaning vehicle or the straddled vehicle.

The inventors of the present teaching conducted studies about the aforementioned issues. As a result, the inventors of the present teaching found out that protection of an optical fiber cable as well as suppression or prevention of a size increase of a vehicle that is a leaning vehicle or a straddled vehicle can be obtained by a configuration in which: the optical fiber cable is disposed in an in-body covered region in the vehicle that is the leaning vehicle or the straddled vehicle such that the optical fiber cable extends along a trunk portion of an electrical cable bundle while being supported by the trunk portion; and a portion of the optical fiber cable is also disposed in the in-body covered region, the portion branching from the trunk portion and extending to a light source unit.

The present teaching was accomplished based on the knowledge described above.

A vehicle according to an aspect of the present teaching has the following configuration.

(1) A vehicle that is a leaning vehicle or a straddled vehicle, the vehicle including:
   a vehicle body including a seat and a body cover, the seat being configured to have a rider seated thereon, the body cover forming an external appearance of the vehicle visible in a side view, the vehicle body supporting a plurality of wheels;

a light source unit that emits a laser beam for lighting purposes or for communication purposes;
one or more light using devices that use the laser beam supplied from the light source unit;
an optical fiber cable configured to guide the laser beam from the light source unit to the one or more light using devices;
an electrical power supply unit;
a plurality of electrical units; and
an electrical cable including a trunk portion and a plurality of branch portions branching from the trunk portion, the trunk portion being electrically connected to the electrical power supply unit, the plurality of branch portions being electrically connected to the plurality of electrical units, respectively,
the optical fiber cable having a supported portion and an upstream portion, the supported portion being along and supported by the trunk portion of the electrical cable, the upstream portion extending from the light source unit to the supported portion without being supported by the trunk portion,
the optical fiber cable being arranged such that both at least a part of the supported portion and at least a part of the upstream portion are disposed at positions within an in-body covered region,
the in-body covered region being at least either one of
a region closer to a vehicle center than an outermost surface of the body cover is in vehicle width direction in a plan view, the region being inside the vehicle body and visibly concealed from the outside of the vehicle, or
a region positioned further in downward direction than an uppermost portion of the seat in a side view, the region being inside the vehicle body and visibly concealed from the outside of the vehicle.

The vehicle of (1) is a leaning vehicle or a straddled vehicle. The vehicle includes the vehicle body, the light source unit, the light using devices, the optical fiber cable, the electrical power supply unit, the plurality of electrical units, and the electrical cable. The vehicle body includes the seat and the body cover. The electrical power supply unit is a battery, for example. The electrical power supply unit is not limited to this, and for example, may be a capacitor, or a combination of a battery and a capacitor. The electrical units are basically electrical components except for the electrical power supply unit. The electrical cable includes the trunk portion and the plurality of branch portions. The trunk portion is electrically connected to the electrical power supply unit. The plurality of branch portions branches from the trunk portion, and is electrically connected to the plurality of electrical units, respectively. The optical fiber cable is configured to guide a laser beam from the light source unit to the light using devices. The optical fiber cable has the supported portion and the upstream portion. The supported portion is one that is along and supported by the trunk portion of the electrical cable. The upstream portion is one that extends from the light source unit to the supported portion without being supported by the trunk portion.

The electrical cable has a core wire made of a metal and a sheath (exterior cover) made of a resin, for example. The optical fiber cable has an optical fiber core wire made of a resin and a sheath made of a resin, for example. The electrical cable provided in the vehicle that is the leaning vehicle or the straddled vehicle is more likely to keep its shape as compared to the optical fiber cable, the shape of the electrical cable being formed in, for example, assembly of the vehicle. Since the optical fiber cable is along the electrical cable and supported by the trunk portion of the electrical cable, free deformation or displacement caused by vibration or the like is likely to be suppressed. Accordingly, in the vehicle of (1), prevention or suppression of deformation and/or displacement of the optical fiber cable can be achieved. The in-body covered region is at least either one of: the region closer to the vehicle center than the outermost surface of the body cover is in the vehicle width direction in a plan view, the region being inside the vehicle body and visibly concealed from the outside of the vehicle; or the region positioned further in the downward direction than the uppermost portion of the seat in a side view, the region being inside the vehicle body and visibly concealed from the outside of the vehicle. In the in-body covered region in the vehicle that is the leaning vehicle or the straddled vehicle, components are arranged densely. In the vehicle of (1), both prevention or suppression of contact of the optical fiber cable, which has a stiffness weaker than that of the electrical cable for example, with an object outside the vehicle, and prevention or suppression of contact of the optical fiber cable with a component due to vibration while the optical fiber cable extends in a narrow space in the in-body covered region, can be achieved. Since the trunk portion of the electrical cable extends along the optical fiber cable, the trunk portion of the electrical cable is likely to protect the optical fiber cable from being in contact with a component. In the vehicle of (1), prevention or suppression of contact of the optical fiber cable with each component can be achieved. Even if the optical fiber cable is directly in contact with a component, deformation or displacement, or damage of the optical fiber cable can be prevented or suppressed because the optical fiber cable is supported by the electrical cable. The upstream portion of the optical fiber cable, which extends from the light source unit to the supported portion, is also disposed in the in-body covered region, and therefore contact of the optical fiber cable extending from the supported portion with each component can be prevented or suppressed, too. Accordingly, a size increase of a space between components can be prevented or suppressed. In addition, the electrical cable, which is provided in the vehicle that is the leaning vehicle or the straddled vehicle, is also used to support the optical fiber cable, and this can contribute to suppression of a size increase or new creation of an installation space. Both protection of the optical fiber cable and suppression of a size increase of the vehicle that is the leaning vehicle or the straddled vehicle can be obtained. In the vehicle of (1), the optical fiber cable is along the electrical cable. This allows the optical fiber cable to be supported while being routed along a wider possible range of paths and places where no frame is disposed, as compared to a case where the optical fiber cable is just along a frame of the vehicle body, for example. Accordingly, a higher degree of freedom in routing can be obtained while both protection of the optical fiber cable and suppression of a size increase are obtained.

In another aspect of the present teaching, the vehicle may have the following configuration.

(2) In the vehicle according to (1),
the in-body covered region is at least either one of
a region closer to a vehicle center than an outermost surface of the body cover is in vehicle width direction in a plan view, the region being inside the vehicle body and made visibly concealed from the outside of the vehicle because of a vehicle component that is in contact with a rider riding on the vehicle while traveling, or a region positioned further in downward direction than an uppermost portion of the seat in a side view, the region being inside the vehicle body and made visibly concealed from the outside of the vehicle because of a vehicle component that is in contact with a rider riding on the vehicle while traveling.

In the vehicle of (2), both suppression of a situation where the optical fiber cable is in contact with the rider, and suppression of a situation where the optical fiber cable is in contact with the outside of the vehicle, can be obtained. This can enhance the protection of the optical fiber cable.

In another aspect of the present teaching, the vehicle may have the following configuration.

(3) In the vehicle according to (1) or (2),
the in-body covered region is at least either one of
a region closer to a vehicle center than an outermost surface of the body cover is in vehicle width direction in a plan view, the region being inside the vehicle body and made visibly concealed from the outside of the vehicle because of a leg load component that receives a load from a leg of a rider riding on the vehicle while traveling, or
a region positioned further in downward direction than an uppermost portion of the seat in a side view, the region being inside the vehicle body and made visibly concealed from the outside of the vehicle because of the leg load component that receives a load from a leg of a rider riding on the vehicle while traveling.

In the vehicle of (3), both suppression of an influence of the load that the optical fiber cable receives from the rider while traveling, and suppression of a situation where the optical fiber cable is in contact with the outside of the vehicle, can be obtained. This can enhance the protection of the optical fiber cable.

In another aspect of the present teaching, the vehicle may have the following configuration.

(4) In the vehicle according to any one of (1) to (3),
the in-body covered region is at least either one of
a region closer to a vehicle center than an outermost surface of the body cover is in vehicle width direction in a plan view, the region being inside the vehicle body and made visibly concealed from the outside of the vehicle by the seat, a fuel tank, or a dummy tank, or
a region positioned further in downward direction than an uppermost portion of the seat in a side view, the region being inside the vehicle body and made visibly concealed from the outside of the vehicle by the body cover.

In the vehicle of (4), both suppression of an influence of a load received by a rider while traveling in the seat and the body cover, which are located close to the rider's body while traveling, and suppression of contact with the outside of the vehicle, can be obtained. This can enhance the protection of the optical fiber cable.

In another aspect of the present teaching, the vehicle may have the following configuration.

(5) In the vehicle according to any one of (1) to (4),
the supported portion of the optical fiber cable is tied to the trunk portion so as to be along and supported by the trunk portion of the electrical cable, so that an optical-electrical cable bundle is formed.

In the vehicle of (5), the optical fiber cable is tied to the trunk portion, which can also in part, be an electrical cable, and this constitutes an optical-electrical cable bundle. This can make it easy to keep the shape of the optical-electrical cable bundle including the optical fiber cable, and can make it easy to suppress free displacement or deformation caused by vibration or the like. Accordingly, in the vehicle of (5), both a higher degree of protection of the optical fiber cable and further suppression of a size increase of the vehicle that is the leaning vehicle or the straddled vehicle can be obtained.

The optical-electrical cable bundle is formed by tying of at least a part of one or more optical fiber cables with one or more electrical cables. An optical fiber cable and an electrical cable (for example, an optical-electrical composite cable, an optical-metal composite cable) housed in a tube do not correspond to the optical-electrical cable bundle if the optical fiber cable is not supported by the electrical cable.

The optical-electrical cable bundle may be formed by tying of one or more optical fiber cable bundles with one or more electrical cable bundles. The optical-electrical cable bundle may be formed by tying of one or more optical fiber cable bundles with one or more electrical cables. The optical-electrical cable bundle may be formed by tying of one or more electrical cable bundles with one or more optical fiber cables.

In another aspect of the present teaching, the vehicle may have the following configuration.

(6) In the vehicle according to (5),
the optical-electrical cable bundle has a stiffness stronger than the stiffness of the supported portion of the optical fiber cable.

The vehicle of (6) can make it easy to keep the shape of the optical fiber cable, and can make it easy to suppress free displacement or deformation caused by vibration or the like. Accordingly, in the vehicle of (6), both a higher degree of protection of the optical fiber cable and further suppression of a size increase of the vehicle that is the leaning vehicle or the straddled vehicle can be obtained.

In another aspect of the present teaching, the vehicle may have the following configuration.

(7) In the vehicle according to (5) or (6),
the optical-electrical cable bundle is configured to maintain a state where side surfaces of the supported portion and the trunk portion adjacent to each other are in contact with each other throughout an entire area or at a plurality of locations in a longitudinal direction of the optical-electrical cable bundle.

The vehicle of (7) can further make it easy to keep the shape, and can further make it easy to suppress free displacement or deformation caused by vibration or the like. Accordingly, in the vehicle of (7), both a higher degree of protection of the optical fiber cable and further suppression of a size increase of the vehicle that is the leaning vehicle or the straddled vehicle can be obtained.

In another aspect of the present teaching, the vehicle may have the following configuration.

(8) In the vehicle according to any one of (5) to (7),
the optical-electrical cable bundle is configured such that relative free displacement between the supported portion and the trunk portion adjacent to each other in the optical-electrical cable bundle is restricted throughout an entire area or at a plurality of locations in a longitudinal direction of the optical-electrical cable bundle.

The vehicle of (8) can make it easy to keep the shape of the optical fiber cable, and can make it easy to suppress free displacement or deformation caused by vibration or the like. Accordingly, in the vehicle of (8), both a higher degree of protection of the optical fiber cable and further suppression of a size increase of the vehicle that is the leaning vehicle or the straddled vehicle can be obtained. The restriction of free displacement may be: a restriction of free displacement at least in the a longitudinal direction; a limitation of a distance over which the free displacement is allowed; or a combination of the two, for example.

In another aspect of the present teaching, the vehicle may have the following configuration.

(9) In the vehicle according to any one of (5) to (8), the optical-electrical cable bundle is formed by ring-shaped tying made with tie members at a plurality of locations in a longitudinal direction of the optical-electrical cable bundle, or by spiral tying made with a tie member.

The vehicle of (9) can make it easy to keep the shape of the optical fiber cable, and can make it easy to suppress free displacement or deformation caused by vibration or the like. Accordingly, in the vehicle of (9), both a higher degree of protection of the optical fiber cable and further suppression of a size increase of the vehicle that is the leaning vehicle or the straddled vehicle can be obtained. The tying with the tie member is made by, for example, the tie member being wound in circumferential direction. For example, each plurality of tie members disposed at different positions in the longitudinal direction of the optical-electrical cable bundle can be wound so as to form a ring shape. Alternatively, a tie member can be wound so as to form a helix shape.

In another aspect of the present teaching, the vehicle may have the following configuration.

(10) In the vehicle according to any one of (1) to (9), a direct distance between a light output point of the light source unit and an optical cable joining point is shorter than a direct distance between an electricity output point of the electrical power supply unit and the optical cable joining point, and the optical cable joining point corresponds to a boundary position between the supported portion and the upstream portion.

In the vehicle of (10), the distance from the light output point to the optical cable joining point is short, and therefore contact with a component of the vehicle caused by vibration can further be suppressed in the in-body covered region. This can enhance the protection of the optical fiber cable.

In another aspect of the present teaching, the vehicle may have the following configuration.

(11) In the vehicle according to any one of (1) to (10), a length of a part of the optical fiber cable from a light output point of the light source unit to an optical cable joining point is shorter than a length of a part of the electrical cable from an electricity output point of the electrical power supply unit to the optical cable joining point, and the optical cable joining point corresponds to a boundary position between the supported portion and the upstream portion.

In the vehicle of (11), the part of the optical fiber cable from the light output point to the optical cable joining point is short, and therefore contact with a component of the vehicle caused by vibration can further be suppressed in the in-body covered region. This can enhance the protection of the optical fiber cable.

In another aspect of the present teaching, the vehicle may have the following configuration.

(12) In the vehicle according to any one of (1) to (11), the vehicle body includes
a main body including the seat and the body cover, and
a movable part configured to be steerable to displace together with a part of the wheels and relative to the main body, and
both the trunk portion and the supported portion are, or only the trunk portion is, disposed so as to extend over the main body and the movable part.

In the vehicle that is the leaning vehicle or the straddled vehicle, as mentioned above, components are arranged at relatively narrow intervals, which makes it difficult to provide an installation space for a cable. In addition, the movable part displaces when steered. Thus, displacement of the movable part takes place at a relatively high frequency. In such a condition, the optical-electrical cable bundle extends over the main body and the movable part. In the vehicle of (12), prevention or suppression of contact of the optical fiber cable with another component can be obtained. Damage of the optical fiber cable, which would be caused by contact of the optical fiber cable with another component, can be prevented or suppressed.

The terminology used herein is for defining particular embodiments only and is not intended to be limiting the teaching. As stated herein, the term "and/or" includes any and all combinations of one or more of the associated listed items. As stated herein, the terms "including," "comprising," or "having," and variations thereof specify the presence of stated features, steps, operations, elements, components, and/or equivalents thereof, and can include one or more of steps, operations, elements, components, and/or their groups. As stated herein, the terms "attached," "connected," "coupled," and/or equivalents thereof are used in a broad sense, and include both of direct and indirect attachment and coupling unless otherwise specified. The terms "connected" and "coupled" are not limited to physical or mechanical connection or coupling, and can include direct and indirect electrical connection and coupling. Unless otherwise defined, all terms (including technical and scientific terms) used herein have the same meaning as commonly understood by one of ordinary skill in the art to which the present teaching belongs. It will be further understood that terms, such as those defined in commonly used dictionaries, should be interpreted as having a meaning that is consistent with their meaning in the context of the present teaching and relevant art and should not be interpreted in an idealized or overly formal sense unless expressly so defined herein. It will be understood that the description of the present teaching discloses multiple techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

This Description is giving an explanation about a novel vehicle. In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

No limitation is put on combining configurations according to the other aspects described above. Before detailed descriptions of embodiments, it should be understood that the present teaching is not limited to the details of the configuration and arrangement of elements shown in the description below or illustrated in the drawings. The present teaching may be carried out in other embodiments, and may be carried out in embodiments having various modifications. The present teaching can be carried out in appropriate combinations of variations given later.

The straddled vehicle refers to a type of a vehicle on which a rider sits astride a saddle. A motorcycle is not particularly limited, and for example, may be a motorcycle. The straddled vehicle is not limited to two-wheeled motorcycles, and may be, for example, a three-wheeled motorcycle having three wheels, an all-terrain vehicle (ATV) having four wheels, or a recreational off-highway vehicle (ROV).

The leaning vehicle is one that makes a turn in a leaning posture. The leaning vehicle is configured to lean inward of a curve when making a turn. The leaning vehicle may serve as the straddled vehicle, too. The leaning vehicle may be, for example, a straddled vehicle configured to lean inward of a curve when making a turn. Examples of such a vehicle include a motorcycle, a three-wheeled motorcycle, and the like. The three-wheeled motorcycle may be a type having two front wheels, or may be a type having two rear wheels. The leaning vehicle has a bar-shaped steering handle (bar handle), for example.

The vehicle that is the leaning vehicle or the straddled vehicle is one that travels with power of an engine, for example. The vehicle, however, is not particularly limited, and may be an electric automobile or a hybrid electric automobile, for example.

The electrical power supply unit is a battery, for example. The electrical power supply unit, however, is not particularly limited, and may be a capacitor or a combination of a battery and a capacitor, for example.

The electrical units are, for example, electrically operating devices except for the electrical power supply unit. Examples of the electrical units may include a lamp, a switch, an actuator, a computer, a relay, a starting motor, and a combination of them. There, it should be noted that neither an electrical cable having a function of just electrically having connections at opposite ends when the vehicle is in a normal state, nor a fuse, is encompassed by the electrical units.

The trunk portion of the electrical cable is one that is electrically connected to the electrical power supply unit. The branch portions of the electrical cable are ones that branch from the trunk portion and are electrically connected to the plurality of electrical units, respectively. For example, in a case of the electrical power supply unit being electrically connected via an electrical cable, a fuse, and an electrical cable to a terminal of a switch, the switch being an electrical unit, the electrical cables serve as the trunk portion because they are electrically connected to the electrical power supply unit. For example, an electrical cable that is connected to another terminal of the foregoing switch is not included in the trunk portion even if the electrical cable is joined to the trunk portion.

The light source unit emits a laser beam for lighting purposes, for example. The light source unit may emit a laser beam for communication purposes, the laser beam representing data, for example.

The light using device is one that uses a laser beam to implement lighting or communication. The light using device is a light emitting part that receives a laser beam and emits light to the outside, for example. The light using device is not particularly limited, and may be an optical communication device that receives a laser beam representing data and decodes data from the laser beam, for example.

The supported portion of the optical fiber cable is, for example, disposed in the in-body covered region and outside the in-body covered region such that the supported portion is along and supported by the trunk portion. The optical fiber cable is not particularly limited, and for example, the supported portion of the optical fiber cable may be disposed only in the in-body covered region such that the supported portion is along and supported by the trunk portion, for example. There, a portion that is supported by the branch portion of the electrical cable does not correspond to the supported portion.

At least the supported portion of the optical fiber cable is, for example, tied to the trunk portion, and thus supported by the trunk portion. How the supported portion is supported is not particularly limited, however, and the supported portion of the optical fiber cable and the trunk portion may be inserted into the same tube so that the supported portion is supported by the trunk portion.

The upstream portion of the optical fiber cable is one that is upstream in a travel direction of light that is outputted from the light source unit. The upstream portion of the optical fiber cable is one that extends from the light source unit to the supported portion.

The in-body covered region is, for example, either one of: a region that is closer to the vehicle center than that of the outermost surface of the body cover, considering the vehicle width direction in a plan view, the region being inside the vehicle body and visibly concealed from the outside of the vehicle; or a region that is positioned further in the downward direction than the uppermost portion of the seat in a side view, the region being inside the vehicle body and visibly concealed from the outside of the vehicle. The in-body covered region is not particularly limited, and for example, may be a region closer to the vehicle center than that of the outermost surface of the body cover, considering the vehicle width direction in a plan view, the region being inside the vehicle body and visibly concealed from the outside of the vehicle, and a region that is positioned further in the downward direction than the uppermost portion of the seat in a side view, the region being inside the vehicle body and visibly concealed from the outside of the vehicle.

The in-body covered region is, for example, either one of: a region that is closer to the vehicle center than that of the outermost surface of the body cover, considering the vehicle width direction in a plan view, the region being inside the vehicle body and visibly concealed from the outside of the vehicle because of a vehicle component that is in contact with a rider riding on the vehicle while traveling; or a region that is positioned further in the downward direction than the uppermost portion of the seat in a side view, the region being inside the vehicle body and visibly concealed from the outside of the vehicle because of a vehicle component that is in contact with a rider riding on the vehicle while traveling. The in-body covered region is not particularly limited, and for example, may be both of a region that is closer to the vehicle center than that of the outermost surface of the body cover, considering the vehicle width direction in a plan view, the region being inside the vehicle body and visibly concealed from the outside of the vehicle because of a vehicle component that is in contact with a rider riding on the vehicle while traveling, and a region that is positioned further in the downward direction than the uppermost portion of the seat in a side view, the region being inside the vehicle body and visibly concealed from the outside of the vehicle because of a vehicle component that is in contact with a rider riding on the vehicle while traveling.

The in-body covered region is, for example, either one of: a region that is closer to the vehicle center than that of the outermost surface of the body cover considering the vehicle width direction in a plan view, the region being inside the vehicle body and visibly concealed from the outside of the vehicle because of a leg load component that receives a load from a leg of a rider riding on the vehicle while traveling, or a region positioned further in the downward direction than the uppermost portion of the seat in a side view, the region being inside the vehicle body and made visibly concealed from the outside of the vehicle because of the leg load component that receives a load from a leg of a rider riding on the vehicle while traveling. The in-body covered region is not particularly limited, and for example, may be a region closer to the vehicle center than the outermost surface of the body cover is in the vehicle width direction in a plan view, the region being inside the vehicle body and made visibly concealed from the outside of the vehicle because of a leg load component that receives a load from a leg of a rider riding on the vehicle while traveling, and a region positioned further in the downward direction than the uppermost portion of the seat in a side view, the region being inside the vehicle body and made visibly concealed from the outside of the vehicle because of the leg load component that receives a load from a leg of a rider riding on the vehicle while traveling.

The component that is in contact with the rider riding on the vehicle while traveling is, for example, a component that is touched by a hand of the rider riding on the vehicle, a leg of the rider, and a conductor while the vehicle is traveling.

The leg load component that receives the load from the leg of the rider of the vehicle is encompassed because of the vehicle component that is in contact with the rider riding on the vehicle while traveling. The leg load component is, for example, a fuel tank, a dummy tank with a shape resembling the shape of the fuel tank, a foot board, a seat, or a combination of them. The dummy tank is a component that is disposed instead of the fuel tank in an electric vehicle, for example.

The seat and the tank of the vehicle that is the leaning vehicle or the straddled vehicle are parts in contact with the rider, unlike those of an automobile.

The movable part configured to be steered to displace together with a part of the wheels and relative to the main body is, for example, a front suspension, a handle, and devices attached to them. The movable part, however, is not particularly limited, and may include a windshield and a meter that are disposed so as to displace relative to the main body, for example.

Advantageous Effects of Invention

The present teaching can adopt lighting or communication using a laser beam, while obtaining both protection of an optical fiber cable and suppression of a size increase of a vehicle that is a leaning vehicle or a straddled vehicle.

BRIEF DESCRIPTION OF DRAWINGS

FIG. 2 is applicable.

DESCRIPTION OF EMBODIMENTS

Figure 1:
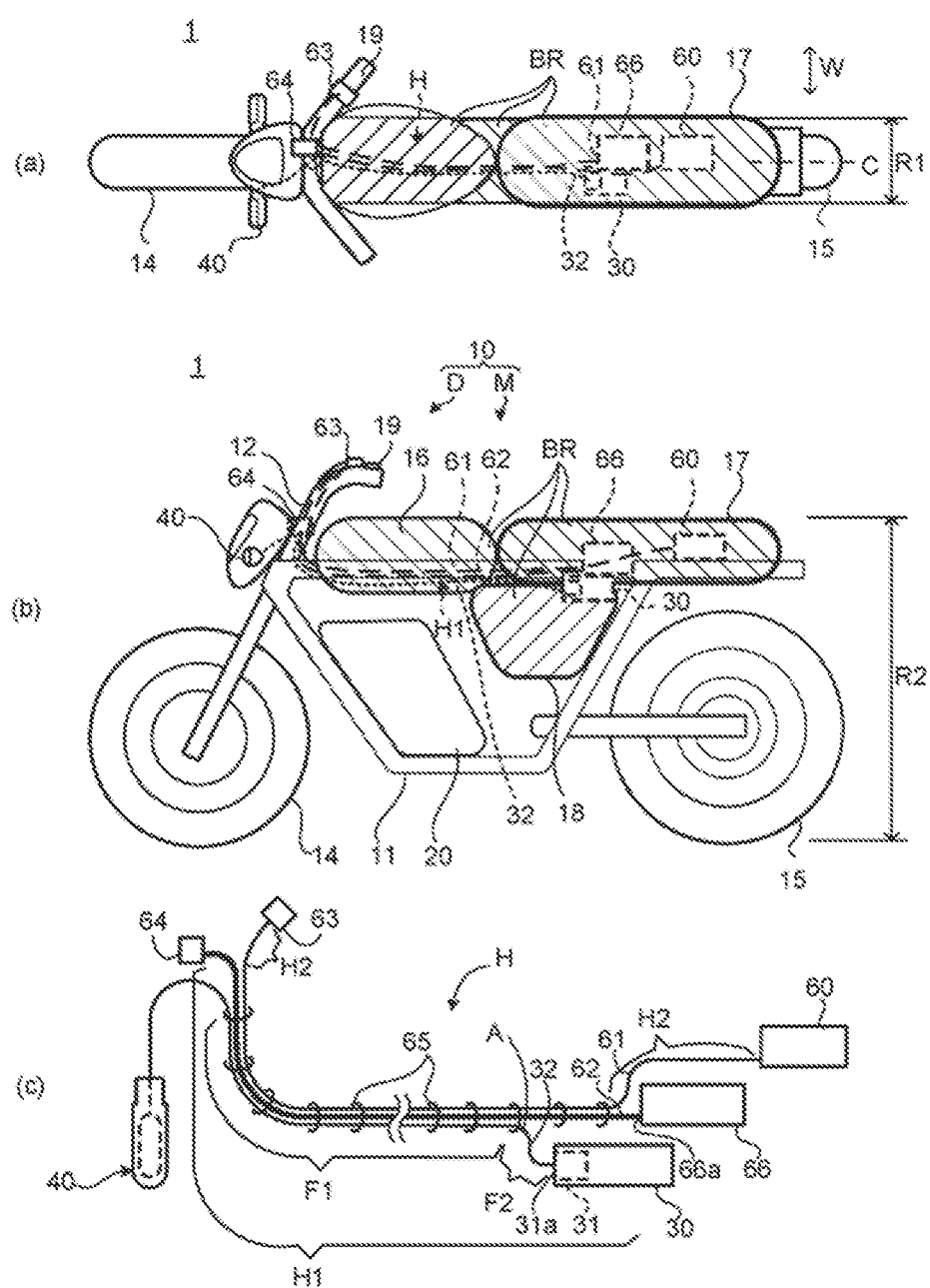
FIG. 1(a) is a schematic plan view of a vehicle according to first embodiment of the present teaching. (b) is a schematic side view of the vehicle. (c) is a diagram showing an optical-electrical cable bundle provided in the vehicle.

FIG. 1 is a schematic diagram for explanation of first embodiment of the present teaching. FIG. 1(a) is a schematic plan view of a vehicle. FIG. 1(b) is a schematic side view of the vehicle. FIG. 1(c) is a diagram showing an optical-electrical cable bundle provided in the vehicle.

The vehicle 1 shown in FIGS. 1(a) and (b) is a straddled vehicle. The vehicle 1 is a leaning vehicle, too. The vehicle 1 leans toward the center of a curve when making a turn. The vehicle 1 includes a vehicle body 10, a light source unit 30, two or more light using devices 40, an optical fiber cable 32, an electrical power supply unit 66, and electrical cables 61, 62.

The vehicle body 10 supports a plurality of wheels 14, 15. The vehicle body 10 has a seat 17 and a body cover 18. On the seat 17, a rider is seated. The body cover 18 forms an external appearance of the vehicle visible in the side view shown in FIG. 1(b). The vehicle body 10 has a motive power source 20, too. The motive power source 20 drives the wheel 15. The motive power source 20 is an internal combustion engine, for example. An electric motor is also adoptable as the motive power source 20. Both the internal combustion engine and the electric motor may be adopted. The vehicle 1 includes a fuel tank 16. The motive power source 20 is not particularly limited, and for example, may be an electric motor. In such a case, a dummy tank may be provided instead of the fuel tank 16.

The light source unit 30 produces a laser beam for lighting purposes. The light source unit 30 is a laser beam source unit. The light source unit 30 receives a supply of electric power, to output a laser beam. The light source unit 30 has a laser beam source element 31. The light source unit 30 emits to the outside a laser beam that is outputted from the laser beam source element 31.

The light using device 40 uses the laser beam supplied from the light source unit 30. The light using device 40 is a light emitting part. The light using device 40 radiates, toward the outside of the vehicle 1, the laser beam supplied from the light source unit 30. The light using device 40, for example, changes a color of the laser beam supplied from the light source unit 30, and radiates the resultant toward the outside. The light using device 40 is a flasher lamp, for example. The vehicle 1 includes the two or more light using devices 40, and the light source unit 30 outputs a laser beam not only to the flasher lamp but also to the other light using devices 40. Therein, for ease of view of the configuration, only the flasher lamp out of the two or more light using devices 40 is shown as an example, and the light using devices 40 other than the flasher lamp will be described later.

The optical fiber cable 32 guides a laser beam from the light source unit 30 to the light using devices 40. In the example shown in FIG. 1, the optical fiber cable 32 guides a laser beam outputted from the light source unit 30 to the light using devices 40 serving as light emitting parts. The optical fiber cable 32 has an optical fiber core wire made of a resin and a sheath made of a resin, though not shown.

More specifically, the optical fiber cable 32 guides to the light using devices 40 a laser beam outputted from a light output point 31a of the light source unit 30. The optical fiber cable 32 is connected to the light output point 31a of the light source unit 30. The light output point 31a is, for example, an optical connector disposed in the light source unit 30.

The electrical power supply unit 66 supplies electric power to each part of the vehicle 1. The electrical power supply unit 66 is a battery, for example. Electrical units 60, 63, 64 are devices different from the electrical power supply unit 66. The electrical units 60, 63, 64 are devices that operate electrically.

FIG. 1 shows an example of the electrical units 60, 63, 64. The electrical unit 60 is a control device composed of an electronic computer. The control device serving as the electrical unit 60 controls operations of the motive power source 20, for example. The electrical unit 63 is a starting switch. The starting switch serving as the electrical unit 63 is a switch for starting the engine serving as the motive power source 20 upon being manipulated, for example. The electrical unit 64 is a main switch. The main switch serving as the electrical unit 64 is a switch for supplying electric power of the electrical power supply unit 66 to the other electrical units 60, 63 upon being manipulated. Not only the electrical units 60, 63, 64 illustrated in the drawings but also a switch, a lamp, an actuator, a computer, a relay, a sensor, and a starting motor (all not shown) are encompassed by the electrical units according to the present disclosure. An electrical cable or a fuse is not encompassed by the electrical units, however.

The electrical cables 61, 62 are cables for transmitting electricity. The electrical cables 61, 62 are connected to the electrical power supply unit 66 or to the electrical units 60, 63, 64. Each of the electrical cables 61, 62 has a core wire made of a metal and a sheath made of a resin, though not shown.

In the example shown in FIG. 1, the electrical cable 61 is electrically connected to the control device serving as the electrical unit 60 and to the starting switch serving as the electrical unit 63. The electrical cable 61 transmits electricity between the electrical unit 60 and the electrical unit 63. The electrical cable 62 is electrically connected to the electrical power supply unit 66 and to the main switch serving as the electrical unit 64. The electrical cable 62 transmits electricity between the electrical power supply unit 66 and the electrical unit 64. The electrical cable 62 transmits electric power outputted from the electrical power supply unit 66. This is why the electrical cable 62 is thicker than the other electrical cable 61. In addition, an electrical cable (not shown) different from the electrical cable 61 extends out from the control device serving as the electrical unit 60. For example, an electrical cable that supplies a signal or electric power for operating the motive power source 20 extends out from the control device serving as the electrical unit 60. Moreover, an electrical cable (not shown) also extends out from the electrical power supply unit 66 to another electrical unit such as the relay (not shown). Therefore, for ease of view of the configuration, only the electrical cables 61, 62 are illustrated as an example.

A part of the electrical cable 61 is along a part of the electrical cable 62, and is supported by the part of the electrical cable 62. The electrical cables 61, 62 are in a bundle. The bundle of the electrical cables 61, 62 includes a trunk portion H1 and a plurality of branch portions H2. The trunk portion H1 is a portion that is electrically connected to the electrical power supply unit 66. The branch portions H2 are portions that branch from the trunk portion H1 and are electrically connected to the a plurality of electrical units 60, 63, respectively. In the present Description, "joining" of cables encompasses a configuration in which the a plurality of electrical cables 61, 62 extending from places remote from each other reach a region where they extend along each other and are supported by each other. In other words, joining of the a plurality of electrical cables 61, 62 does not mean that they are electrically connected to each other; however, definition of the joining is not particularly limited, and for example, it may also be possible that a plurality of electrical cables are electrically connected, or their conductors are put together so that they are electrically connected. In the present Description, "branching" of cables is a configuration that can be expressed in the way opposite to joining. In the configuration, the a plurality of electrical cables 61, 62 in the region where they extend along each other and are supported by each other become separated from each other.

The optical fiber cable 32 has a supported portion F1 and an upstream portion F2.

The supported portion F1 is a portion that is along the trunk portion H1 of the electrical cables 61, 62 and is supported by the trunk portion H1. The upstream portion F2 is a portion that extends from the light source unit 30 to the supported portion F1 without being supported by the trunk portion H1. A point corresponding to a boundary position between the supported portion F1 and the upstream portion F2 is an optical cable joining point A.

More specifically, as shown in FIG. 1(c), a part of the optical fiber cable 32 is tied to the electrical cables 61, 62 such that the part is along the trunk portion H1 of the electrical cables 61, 62 and is supported by the trunk portion H1. Thus, the optical fiber cable 32 constitutes an optical-electrical cable bundle H.

In more detail, the optical-electrical cable bundle H is formed by tying made with tie members 65 at a plurality of locations in the longitudinal direction of the supported portion F1 of the optical fiber cable 32. The tie members 65 respectively form ring shapes to wind around the optical-electrical cable bundle H at different locations in the longitudinal direction of the supported portion F1 of the optical-electrical cable bundle H.

Both a part of the supported portion F1 and a part of the upstream portion F2 are disposed at positions within an in-body covered region BR.

The in-body covered region BR is either one of the following two regions. The in-body covered region BR includes an overlap of the following two regions.

(A) A region (R1 in FIG. 1(a)) closer to the vehicle center C than an outermost surface of the body cover 18 is in the vehicle width direction W, for example, in the plan view shown in FIG. 1(a), the region being inside the vehicle body 10 and visibly concealed from the outside of the vehicle 1.

(B) A region (R2 in FIG. 1(b)) positioned further in the downward direction than an uppermost portion of the seat 17, for example, in the side view shown in FIG. 1(b), the region being inside the vehicle body 10 and visibly concealed from the outside of the vehicle 1.

The region that is inside the vehicle body 10 and visibly concealed from the outside of the vehicle 1 is a region that is made visibly concealed from the outside of the vehicle 1 because of a vehicle component that is in contact with a rider riding on the vehicle 1 while traveling, for example.

Furthermore, the region that is inside the vehicle body 10 and visibly concealed from the outside of the vehicle 1 is a region that is made visibly concealed from the outside of the vehicle 1 because of a leg load component that receives a load from a leg of the rider riding on the vehicle 1 while traveling, for example. The leg load component is, for example, the body cover 18, the seat 17, the fuel tank 16, or a dummy tank (not shown).

The optical-electrical cable bundle H has a stiffness higher than the stiffness of the supported portion F1 of the optical fiber cable 32, which constitutes the optical-electrical cable bundle H. To be more specific, the optical-electrical cable bundle H has a bending stiffness higher than the bending stiffness of the supported portion F1 of the optical fiber cable 32. This makes it easy to keep the shape of the optical fiber cable 32, and to suppress free displacement or deformation of the optical fiber cable 32 caused by vibration or the like.

A direct distance from the light output point 31a of the light source unit 30 to the optical cable joining point A is shorter than a direct distance from an electricity output point 66a of the electrical power supply unit 66 to the optical cable joining point A.

A length of a part of the optical fiber cable 32 from the light output point 31a of the light source unit 30 to the optical cable joining point A is shorter than a length of a part of the electrical cable 62 from the electricity output point 66a of the electrical power supply unit 66 to the optical cable joining point A.

Each of the electrical cables 61, 62 has the core wire made of a metal, and therefore has a bending stiffness higher than the bending stiffness of the optical fiber cable 32. When the electrical cables 61, 62 receive an external bending force, the range of their elastic deformation is smaller than the range of elastic deformation of the optical fiber cable 32. That is, upon receiving an external bending force, the electrical cables 61, 62 are likely to make plastic deformation. Accordingly, if the electrical cables 61, 62 are bent in assemblage of the vehicle 1 for example, they are likely to keep bent shapes. In other words, the electrical cables 61, 62 are more likely to keep their shapes than the optical fiber cable 32. In addition, in the part of the optical fiber cable 32 that is along the trunk portion H1 of the electrical cables 61, 62 and is supported by the trunk portion H1, free deformation or displacement caused by vibration or the like is likely to be suppressed, as compared to in the optical fiber cable 32 as a whole. As a result, deformation and/or displacement of the optical fiber cable 32 can be prevented or suppressed. Thus, when the optical fiber cable 32 is arranged so as to pass through a narrow space between components, such as a frame 11, of the vehicle body 10, touching of the optical fiber cable 32 with each component of the vehicle body 10 can be prevented or suppressed.

The supported portion F1 of the optical fiber cable 32 is tied to the trunk portion H1 of the electrical cables 61, 62, to constitute the optical-electrical cable bundle H. This makes it easier to keep the shape of the optical fiber cable 32, and makes it easy to suppress free displacement or deformation of the optical fiber cable 32 caused by vibration or the like.

Since the electrical cables 61, 62 are disposed at positions near or adjacent to the supported portion F1 of the optical fiber cable 32, the optical fiber cable 32 is substantially protected by the electrical cables 61, 62. Direct touching of the optical fiber cable 32 with each component of the vehicle body 10 is likely to be suppressed. Even if the optical fiber cable 32 directly touches a component, deformation or displacement, or damage of the optical fiber cable 32 can be prevented or suppressed because the optical fiber cable 32 is supported by the electrical cables 61, 62. Accordingly, a size increase of a space between components of the vehicle body 10 can be prevented or suppressed. In addition, the electrical cables 61, 62, which are originally provided in the vehicle 1, are also used to support the optical fiber cable 32, and this can contribute to suppression of a size increase of an installation space. In this manner, both protection of the optical fiber cable 32 and suppression of a size increase of the vehicle 1 can be obtained.

The optical-electrical cable bundle H is formed by tying made with the tie members 65 at a plurality of locations in the longitudinal direction of the optical-electrical cable bundle H. This makes it further easier to keep the shape of the optical fiber cable 32, and makes it further easier to suppress free displacement or deformation of the optical fiber cable 32 caused by vibration or the like.

The tie members 65 shown in FIG. 1(c) restrain the cables (32, 61, 62) at the a plurality of locations in the longitudinal direction of the optical-electrical cable bundle H so as to restrict free displacement of adjacent ones of the cables (32, 61, 62) relative to each other in the optical-electrical cable bundle H.

In the optical-electrical cable bundle H, the adjacent ones of the cables (32, 61, 62) are maintained with their side surfaces in contact with each other at the a plurality of locations in the longitudinal direction of the optical-electrical cable bundle H.

A contact friction on the side surfaces of the adjacent cables (32, 61, 62) is used to make it further easier to keep the shape, and to make it easy to suppress free displacement or deformation caused by vibration or the like.

Since the distance from the light output point 31a to the optical cable joining point A is short, touching with a component of the vehicle 1 caused by vibration is further suppressed in the in-body covered region BR. This enhances the protection of the optical fiber cable 32.

Since the part of the optical fiber cable 32 from the light output point 31a to the optical cable joining point A is short, touching with a component of the vehicle 1 caused by vibration is further suppressed in the in-body covered region BR. This enhances the protection of the optical fiber cable 32.

The vehicle body 10 and the optical-electrical cable bundle H will further be described with reference to FIG. 1(a) to (c).

The vehicle body 10 includes a main body M and a movable part D.

The main body M includes the seat 17 and the body cover 18. The main body M also includes the frame 11 to which the seat 17 and the body cover 18 are attached.

The movable part D is steered to displace together with a part of the wheels 14, and relative to the main body M. The movable part D is composed of a front fork 12 and a steering part 19. The movable part D also includes the light using devices 40 fixed to the front fork 12 or to the steering part 19, and the starting switch serving as the electrical unit 63.

The movable part D displaces when steered. Thus, displacement of the movable part D takes place at a relatively high frequency.

The optical-electrical cable bundle His disposed so as to extend over the main body M and the movable part D. More specifically, the optical-electrical cable bundle H extends over the frame 11 of the main body M and the front fork 12 of the movable part D. Still more specifically, the optical fiber cable 32, which is a part of the optical-electrical cable bundle H and extends together with the electrical cables 61, 62 along the frame 11, is disposed across the front fork 12, then is separated from the electrical cables 61, 62, and further extends.

The optical fiber cable 32 does not solely extend over the main body M and the movable part D, but the optical-electrical cable bundle H extends over the main body M and the movable part D. This can prevent or suppress touching of the optical fiber cable 32 with another component.

Second Embodiment

Figure 2:
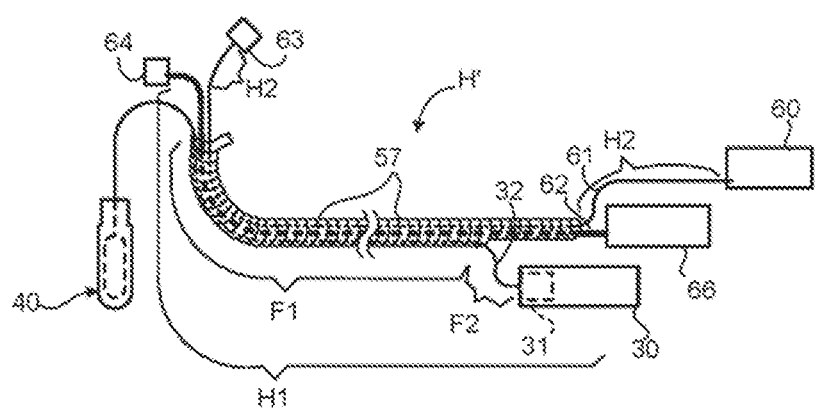
FIG. 2 A schematic diagram for explanation of an optical-electrical cable bundle in second embodiment of the present teaching.

FIG. 2 is a schematic diagram for explanation of an optical-electrical cable bundle in second embodiment of the present teaching.

An optical-electrical cable bundle H' shown in FIG. 2 is formed by spiral tying made with a tie member 57. The optical-electrical cable bundle H' ties an optical fiber cable 32 and electrical cables 61, 62 together along with the longitudinal direction.

More specifically, the tie member 57 is a soft, strip-shaped member. The tie member 57 spirally winds around the optical fiber cable 32 and the electrical cables 61, 62.

In the optical-electrical cable bundle H', adjacent ones of the cables (32, 61, 62) are maintained with their side surfaces in contact with each other throughout the entire area in the longitudinal direction of the optical-electrical cable bundle H'.

[Example of Application of Connection Configuration]

Figure 3:
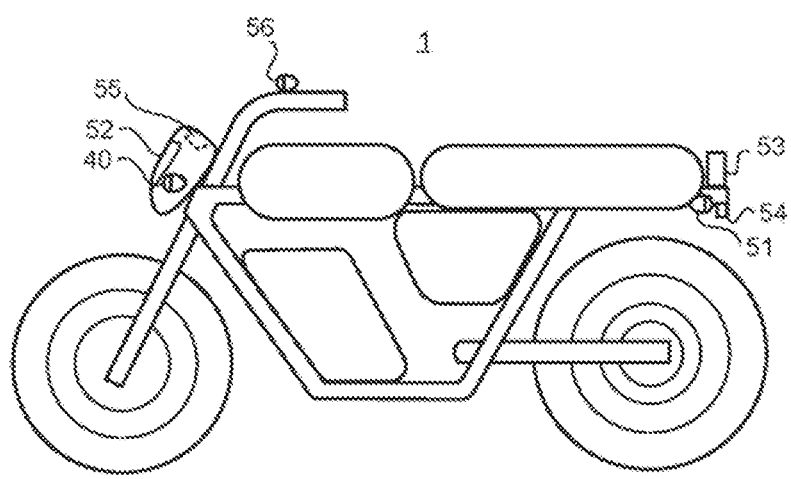
FIG. 3 A diagram showing an example of devices to which the connection configuration shown in FIG. 1

FIG. 3 is a diagram showing an example of devices to which the connection configuration shown in FIG. 1 or FIG. 2 is applicable.

The configuration of the optical fiber cable 32 described in each of the foregoing embodiments is applicable as, for example, an optical fiber cable 32 for guiding a laser beam to each of a rear turn signal 51, a headlight 52, a stop lamp 53, a license plate lamp 54, and a meter lamp 55 shown in FIG. 3. Although the drawing illustrates light using devices 40 disposed left in the vehicle 1 as an example of the devices to which a laser beam is guided by the optical fiber cable 32 (see FIG. 1 or FIG. 2), the configuration of the optical fiber cable 32 is applicable to a right turn signal (not shown), too. The configuration of the optical fiber cable 32 is applicable as an optical fiber cable 32 for guiding a laser beam to a high beam headlight and a low beam headlight included in the headlight 52. In a case of the vehicle 1 including a position light, a daytime running light, or an auxiliary headlight different from the headlight 52, the configuration of the optical fiber cable 32 is applicable as an optical fiber cable 32 for guiding a laser beam to a position light or a daytime running light, or to an auxiliary headlight, too. For ease of view of the devices, illustration of the optical fiber cable 32 is omitted.

The configuration of the optical fiber cable 32 is applicable not only to a lighting device but also as, for example, an optical fiber cable 32 for guiding a laser beam for communication purposes to an optical transmission device 56 used for optical communication. The optical transmission device 56 transmits data by outputting light to peripheral equipment of the vehicle 1 or to each part of the vehicle 1.

The configuration of the optical fiber cable 32 for guiding a laser beam according to each of the foregoing embodiment may be applied to, for example, all of the rear turn signal 51, the headlight 52, the stop lamp 53, the license plate lamp 54, the meter lamp 55, and the optical transmission device 56 mentioned above. The configuration of the optical fiber cable 32 for guiding a laser beam may be applied to, for example, a part of the above-mentioned devices. In such a case, for the rest of the devices, a different connection configuration is used. It may not always be necessary that a laser beam is used for the rest of the devices.

REFERENCE SIGNS LIST 1 vehicle
10 vehicle body
14, 15 wheel
16 fuel tank
17 seat
18 body cover
30 light source unit
31a light output point
32 optical fiber cable
40 light using device
60 electrical unit
61, 62 electrical cable
63, 64 electrical unit
57, 65 tie member
66 electrical power supply unit
66a electricity output point
A optical cable joining point
BR in-body covered region
C vehicle center
D movable part
F1 supported portion
F2 upstream portion
H, H' electrical cable bundle
H1 trunk portion
H2 branch portion
M main body

The invention claimed is:

1. A vehicle that is a leaning vehicle or a straddled vehicle having a plurality of wheels, the vehicle comprising:
a vehicle body including a seat and a body cover, the seat being configured to have a rider seated thereon, the body cover being positioned to be visible in a side view of the vehicle, the vehicle body supporting the plurality of wheels;
a light source unit that emits a laser beam;
at least one light using device that each uses the laser beam supplied from the light source unit;
an optical fiber cable configured to guide the laser beam from the light source unit to the at least one light using device;
an electrical power supply unit;
a plurality of electrical units; and
an electrical cable including a trunk portion and a plurality of branch portions branching from the trunk portion, the trunk portion being electrically connected to the electrical power supply unit, the plurality of branch portions being electrically connected to the plurality of electrical units, respectively, wherein
the optical fiber cable has a supported portion and an upstream portion, the supported portion being arranged along, and supported by, the trunk portion of the electrical cable, the upstream portion connecting the light source unit and the supported portion without being supported by the trunk portion, and
the optical fiber cable is arranged such that both the supported portion and the upstream portion are partially disposed within an in-body covered region, the in-body covered region being at least one of
a first region that is, in a width direction of the vehicle, closer to a center of the vehicle than an outermost surface of the body cover is, the first region being inside the vehicle body and invisible from an outside of the vehicle, or a second region that is positioned further downward than an uppermost portion of the seat in the side view of the vehicle, the second region being inside the vehicle body and invisible from the outside of the vehicle.

2. The vehicle according to claim 1, further comprising:
a vehicle component configured to be in contact with the rider riding on the vehicle while traveling, so as to make the first and/or second region invisible to the outside of the vehicle.

3. The vehicle according to claim 1, further comprising:
a leg load component configured to receive a load from a leg of the rider riding on the vehicle while traveling, so as to make the first and/or second region invisible to the outside of the vehicle.

4. The vehicle according to claim 1, further comprising a fuel tank or a dummy tank, wherein
the first region is invisible from the outside of the vehicle as being concealed by the seat, the fuel tank, or the dummy tank, and
the second region is invisible from the outside of the vehicle as being concealed by the body cover.

5. The vehicle according to claim 1, wherein
the supported portion of the optical fiber cable is tied to the trunk portion of the electrical cable, to thereby formed an optical-electrical cable bundle.

6. The vehicle according to claim 5, wherein
the optical-electrical cable bundle has a stiffness larger than a stiffness of the supported portion of the optical fiber cable.

7. The vehicle according to claim 5, wherein
the optical-electrical cable bundle is configured to maintain a state in which side surfaces of the supported portion and the trunk portion are in contact with each other throughout, or at a plurality of locations of, the optical-electrical cable bundle in a longitudinal direction thereof.

8. The vehicle according to claim 5, wherein
the optical-electrical cable bundle is configured such that relative displacement between the supported portion and the trunk portion in the optical-electrical cable bundle is restricted throughout, or at a plurality of locations of, the optical-electrical cable bundle in a longitudinal direction thereof.

9. The vehicle according to claim 5, wherein
the optical-electrical cable bundle is formed by ring-shaped tying made with a plurality of first tie members at a plurality of locations in a longitudinal direction of the optical-electrical cable bundle, or by spiral tying made with a second tie member.

10. The vehicle according to claim 1, wherein
the light source unit has a light output point;
the electrical power supply unit has an electricity output point;
the supported portion and the upstream portion of the optical fiber cable are joined to each other at an optical cable joining point; and
a distance between the light output point and the optical cable joining point is shorter than a distance between the electricity output point and the optical cable joining point.

11. The vehicle according to claim 1, wherein
the light source unit has a light output point;
the electrical power supply unit has an electricity output point;
the supported portion and the upstream portion of the optical fiber cable are joined to each other at an optical cable joining point; and
a length of the optical fiber cable between the light output point and the optical cable joining point is shorter than a length of the electrical cable between the electricity output point and the optical cable joining point.

12. The vehicle according to claim 1, wherein
the vehicle body further includes
a main body including the seat and the body cover, and
a movable part configured to be steerable and movable relative to the main body; and
both the trunk portion and the supported portion are, or only the trunk portion is, disposed so as to extend over the main body and the movable part.

* * * * *